United States Patent
Eyer

(10) Patent No.: US 10,666,894 B2
(45) Date of Patent: *May 26, 2020

(54) RECEIVER AND METHOD FOR REPORTING THE USAGE OF ADVANCED TELEVISION SERVICES

(71) Applicant: Saturn Licensing LLC, New York, NY (US)

(72) Inventor: Mark Kenneth Eyer, Woodinville, WA (US)

(73) Assignee: Saturn Licensing LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/616,566

(22) Filed: Jun. 7, 2017

(65) Prior Publication Data

US 2017/0272689 A1 Sep. 21, 2017

Related U.S. Application Data

(63) Continuation of application No. 12/985,241, filed on Jan. 5, 2011, now Pat. No. 9,706,158.

(Continued)

(51) Int. Cl.
*H04N 5/775* (2006.01)
*H04N 21/442* (2011.01)
(Continued)

(52) U.S. Cl.
CPC ......... *H04N 5/775* (2013.01); *H04N 21/4334* (2013.01); *H04N 21/44209* (2013.01);
(Continued)

(58) Field of Classification Search
CPC .................................................... H04N 5/775
(Continued)

(56) References Cited

U.S. PATENT DOCUMENTS 5,819,156 A * 10/1998 Belmont .............. H04N 5/4401
348/552
5,857,190 A 1/1999 Brown
(Continued)

FOREIGN PATENT DOCUMENTS

EP 1 363 204 A2 11/2003
FR 2908574 A1 5/2008
(Continued)

OTHER PUBLICATIONS

"Creating a mobile Broadcast Platform," the MediaFLO System Product Overview, MediaFlow, Qualcomm, pp. 1-8.
(Continued)

*Primary Examiner* — Eileen M Adams
*Assistant Examiner* — Daniel T Tekle
(74) *Attorney, Agent, or Firm* — Oblon, McClelland, Maier & Neustadt, L.L.P.

(57) ABSTRACT

According to one embodiment of the invention, a computerized method for reporting events from a television that supports transmission and playback of digital content in accordance with an Advanced Television Systems Committee (ATSC) standard. The method comprises downloading a triggered declarative object (TDO), which includes a reporting script, for storage within a digital receiver of the television. Thereafter, information associated with one or more detected events that occur during playback of the digital content is recorded and subsequently, upon execution of the reporting script, is output over a communication path separate from a communication path of the received digital content.

20 Claims, 5 Drawing Sheets

Related U.S. Application Data

(60) Provisional application No. 61/319,874, filed on Apr. 1, 2010.

(51) Int. Cl.
*H04N 21/658* (2011.01)
*H04N 21/433* (2011.01)
*H04N 21/61* (2011.01)
*H04N 21/81* (2011.01)
*H04N 5/783* (2006.01)

(52) U.S. Cl.
CPC ... *H04N 21/44222* (2013.01); *H04N 21/6175* (2013.01); *H04N 21/6582* (2013.01); *H04N 21/8166* (2013.01); *H04N 5/783* (2013.01)

(58) Field of Classification Search
USPC ........................................................ 386/343
See application file for complete search history.

(56) References Cited

U.S. PATENT DOCUMENTS

| | | | |
|---|---|---|---|
| 6,137,042 | A | 10/2000 | Kurtzberg et al. |
| 6,173,406 | B1 | 1/2001 | Wang |
| 6,223,292 | B1 | 4/2001 | Dean et al. |
| 7,103,903 | B1 | 9/2006 | Kydd |
| 7,720,435 | B2 | 5/2010 | Bettinger |
| 2002/0087969 | A1 | 7/2002 | Brunheroto et al. |
| 2005/0210524 | A1* | 9/2005 | Dolph ............... H04N 7/17354 725/105 |
| 2008/0162356 | A1 | 7/2008 | Parker et al. |
| 2008/0288411 | A1 | 11/2008 | Copley |
| 2009/0175218 | A1 | 7/2009 | Song et al. |

FOREIGN PATENT DOCUMENTS

| | | |
|---|---|---|
| JP | 2002-335543 | 11/2002 |
| JP | 2005-020432 | 1/2005 |
| KR | 10-2008-00066483 | 7/2008 |

OTHER PUBLICATIONS

D'Erman, Alexandre, "Television Usage Evaluation Through Extended Data Mining on Logged Usage Data", Aug. 16, 2007, pp. 1-94.
Office Action dated Aug. 30, 2013 in Korean Patent Application No. 10-2011-7003709 with English Translation.
Office Action dated Oct. 17, 2013 in Korean Patent Application No. 10-2013-7025182 with English Translation.
Extended European Search Report dated Nov. 22, 2013 in Patent Application No. 11763190.3.
Office Action dated Dec. 3, 2014 in Chinese Patent Application No. 201180015318.1 with English Translation.
Communication Pursuant to Article 94(3) EPS dated Dec. 19, 2014 in European Application No. 11763190.3.
Extended European Search Report dated Jul. 11, 2016, for EP 16157841.4.
European Office Action dated Dec. 23, 2015, in European Appln. Patent No. 11 763 190.3.
European Office Action dated Apr. 5, 2015, in European Patent Appln. No. 11 763 190.3.
Chinese Office Action dated Aug. 19, 2015, in Chinese Patent Appln. No. 201180015318.1 (with English Translation).
Mexican Office Action dated Sep. 9, 2013, in Mexican Patent Appln. No. MX/a/2012/010750 (with English Translation).
Mexican Office Action dated May 30, 2014, in Mexican Patent Appln. No. MX/a/2012/010750 (with English Translation).

\* cited by examiner

RECEIVER AND METHOD FOR REPORTING THE USAGE OF ADVANCED TELEVISION SERVICES

CROSS-REFERENCE TO RELATED APPLICATIONS

This application is a continuation of U.S. patent application Ser. No. 12/985,241, filed Jan. 5, 2011, which is based upon and claims the benefit of priority from U.S. Provisional Patent Application No. 61/319,874 filed Apr. 1, 2010, the entire contents of which are incorporated herein by reference.

FIELD

Embodiments of the present invention relate to the field of communications, and in particular, a networked, advanced digital television receiver and a corresponding method for reporting various events involving user interactivity with received content.

GENERAL BACKGROUND

Service providers, such as traditional media broadcasting systems for example, are currently unable to determine the number of end users who have selected certain content for viewing or download, especially non-real-time (NRT) content. As a result, such broadcasting systems are further incapable of determining how many of these end users actually viewed the downloaded NRT content and which advanced services have been used, namely which services that provide customized viewing of the downloaded content have been used. Measurement of service usage is important feedback for service providers in understanding which content and services are more popular among its customers. Such understanding may affect business decisions by these service providers.

Currently, there are no standardized methods for reporting usage of advanced services made available to end users of NRT content and other types of interactive content. Without further efforts to address the lack of reporting schemes concerning the usage of advanced services, service providers are operating in the blind, and have no knowledge of the popularity or acceptance of advanced services made available to their customers.

BRIEF DESCRIPTION OF THE DRAWINGS

The invention may best be understood by referring to the following description and accompanying drawings that are used to illustrate embodiments of the invention.

DETAILED DESCRIPTION

Figure 1:
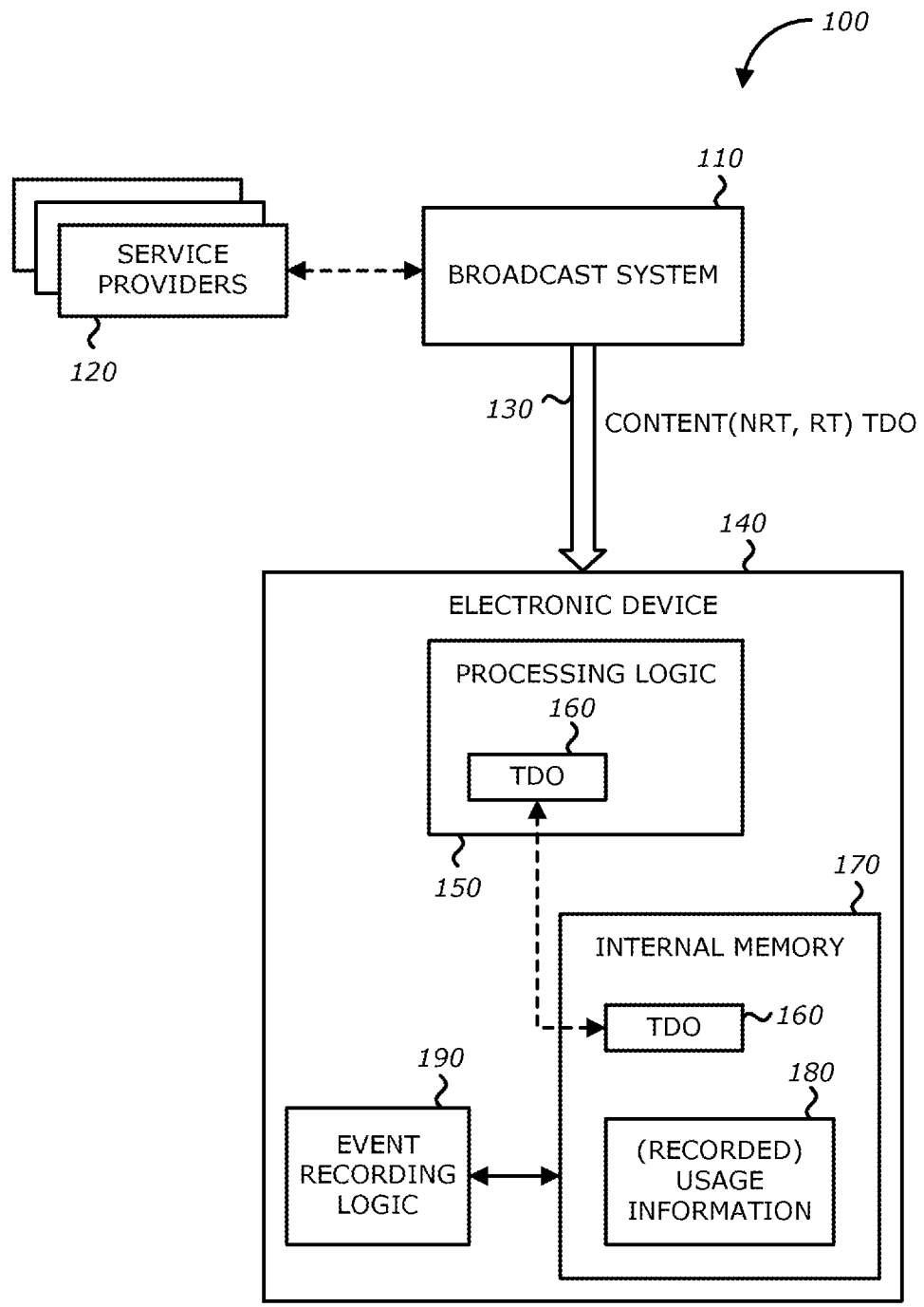
FIG. 1 is a block diagram of an exemplary embodiment of a digital broadcasting system.

Embodiments of the invention relate to a receiver that is configured to support the reporting of information associated with the usage of advanced services. Such reporting is controlled by script executed by the receiver. The script may be provided by the service provider to ensure that certain information important to this service provider is gathered and reported back. Receivers may be adapted to allow the end user to deny loading and/or execution of the reporting script in order to comply with privacy concerns. This opt-out mechanism may be in the form of a pop-up window that requests express permission to upload (or execute). Alternatively, the opt-out mechanism may be expressed prior to the installation/upgrade of the receiver.

Once the reporting script is allowed to be loaded (or executed), such execution may be conducted automatically or may be conducted in response to signaling from an external source.

According to one embodiment of the invention, advanced services may include user-controlled downloading of non-real time content, user interactivity with the downloaded content, and another user-controlled feature supported by Advanced Television Systems Committee (ATSC) 2.0 or other specifications developed by the Advanced Television Systems Committee for digital television transmission over terrestrial, cable and satellite networks. Of course, the invention may be applicable to advanced services in compliance with other data conveyance standards, including Internet Protocol television (IPTV).

Herein, certain terminology is used to describe features of the invention. For example, the term "logic" is generally defined as hardware and/or software. As hardware, logic may include circuitry such as processing circuitry (e.g., a microprocessor, a programmable gate array, a controller, an application specific integrated circuit, etc.), semiconductor memory, combinatorial logic, or the like. As software, the logic may be one or more software modules, such as executable code in the form of an application, an application programming interface (API), an applet, a routine, or one or more instructions. Software modules may be stored in any type of memory, namely a suitable storage medium such as a programmable electronic circuit, a semiconductor memory device including a volatile memory (e.g., random access memory, etc.), any type of non-volatile memory (e.g., read-only memory, flash memory, a hard drive, etc.), a portable memory device (e.g., an optical disk, a Universal Serial Bus "USB" flash drive), or the like.

An "electronic device" generally represents electronics with information processing capabilities such as a television receiver for example. As optional features, electronic device may include a display (e.g., liquid crystal diode ("LCD"), organic LCD (OLCD), plasma, etc.) and speakers to support video/audio playback. An "interconnect" is generally defined as a communication pathway established over an information-carrying medium. This information-carrying medium may be a physical medium (e.g., electrical wire, optical fiber, cable, bus traces, etc.), a wireless medium (e.g., air in combination with wireless signaling technology) or a combination thereof.

A "service provider" generally represents a source and/or distributor of content being delivered and subsequently interacted with, if interactivity is available. Examples of a service provider may include, but are not limited or restricted to a television network operator (e.g. local network television station, affiliate, cable television provider, telco, terrestrial, satellite TV provider, Internet service provider, etc.), an entity supplying access to stored content (e.g., Netflix®, etc.), or the like.

As described below, one embodiment of the invention is generally formulated with (i) a defined standardized format for the recording of specific "events" in an advanced digital television (DTV) receiver, and (2) a pre-defined defined application programming interface (API) that is utilized by the reporting script to recover information pertaining to the specific events. The presence and formulation of APIs are well-known and will not be discussed herein.

An "event" is a performance of an advanced service that would be of interest to a service provider responsible for the supplied content at that time. Types of events may include, but are not limited or restricted to tuning to a particular channel; tuning away from a particular channel; selecting of particular NRT content for download; playing back, pausing or resumed playback of downloaded content.

Certain details are set forth below in order to provide a thorough understanding of various embodiments of the invention, albeit the invention may be practiced through many embodiments other that those illustrated. Well-known logic and operations are not set forth in detail in order to avoid unnecessarily obscuring this description.

Referring to FIG. 1, a block diagram of an exemplary embodiment of a digital broadcasting system 100 is shown. In accordance with one embodiment of the invention, broadcast system 110 receives content from one or more service providers providers 120. Broadcast system 110 is further adapted to transmit content 130 to an electronic device 140 such as a digital television (DTV) receiver, IPTV receiver or the like. Such transmissions may be conducted over a physical and/or wireless medium.

According to one embodiment of the invention, the content transmitted via broadcast system 110 includes one or more of the following: non-real-time (NRT) content, real-time (RT) or linear content, metadata associated with content, and one or more triggered declarative objects (TDOs).

Herein, the NRT content comprises content that may be delivered faster or slower than real-time or may be delivered based on a request. For instance, according to one embodiment of the invention, NRT content may include video and/or audio, images, text (e.g., descriptions of available video and/or audio for download), or hyperlinks to websites that can be displayed by a web browser executed by electronic device 140. An end user can select NRT content from a list of NRT content for later download. The user can also navigate and select NRT content from among previously downloaded content.

The metadata is information associated with real-time and/or NRT content, which is provided to describe such content.

A "TDO" is a downloadable object normally created by a service provider in the content distribution chain, ranging from an original source of the content to the manufacturer of the electronic device adapted to receive the content. According to one embodiment of the invention, the TDO comprises declarative content (e.g., scripts, text, graphics, etc.) whose function and behavior are tied in some way to the accompanying content. For example, a TDO may be adapted with multiple functions, one of which is to report events that involve usage of advanced broadcast services. Other included functionality may offer interactive functions to the user in conjunction with the enjoyment of the accompanying program.

In one embodiment of the invention, electronic device 140 may be included in a set-top box or a device with display and/or audio playback capabilities (e.g. television). Electronic device 140 includes processing logic 150 configured to process content received from broadcast system 110 for playback. In one embodiment of the invention, processing logic 150 includes a processor that is adapted to support serial execution of TDOs, namely one TDO is executed within electronic device 140 at a time. The selection of the particular TDO may be based on one or more parameters such as (i) the particular channel being tuned to, (ii) the particular service provider associated with the content currently being played back by the electronic device, or the like.

As an illustrative example, in response to certain events (e.g. changing of a channel), a provider-defined TDO 160 pertaining to the tuned channel is fetched from internal memory 170 and executed by processing logic 150. One function of TDO 160 is to report usage of advanced services for electronic device 140. This may be accomplished by TDO 160 (i) initially determining where information pertaining to events that have occurred while being tuning to the selected channel are stored (hereinafter "recorded usage information" 180), (ii) fetching recorded usage information 180, and (iii) transmitting the recorded usage information 180 to the service provider associated with the selected channel (or to another entity designated by the service provider to receive usage information 180). The determination of where usage information 180 resides may be accomplished by the reporting script accessing one or more Application Programming Interfaces (APIs) created as part of the device's platform in order to assist reporting scripts created by all service providers in fetching its corresponding usage information. Thus, a common scheme may be used to locate usage information 180, but one service provider will not be given information on the behavior of users interacting with a channel controlled by another service provider.

Also implemented within electronic device 140, event recording logic 190 is adapted to record information associated with detected event(s) that occur during playback of the content. According to one embodiment of the invention, these events involve user interactivity with downloaded content that have been monitored and recorded by event recording logic 190, where information pertaining to these events are stored within files or dedicated memory locations reserved for the particular channel number that is tuned to when the event occurs or for the service provider that provided the content or broadcasted the content.

Figure 2:
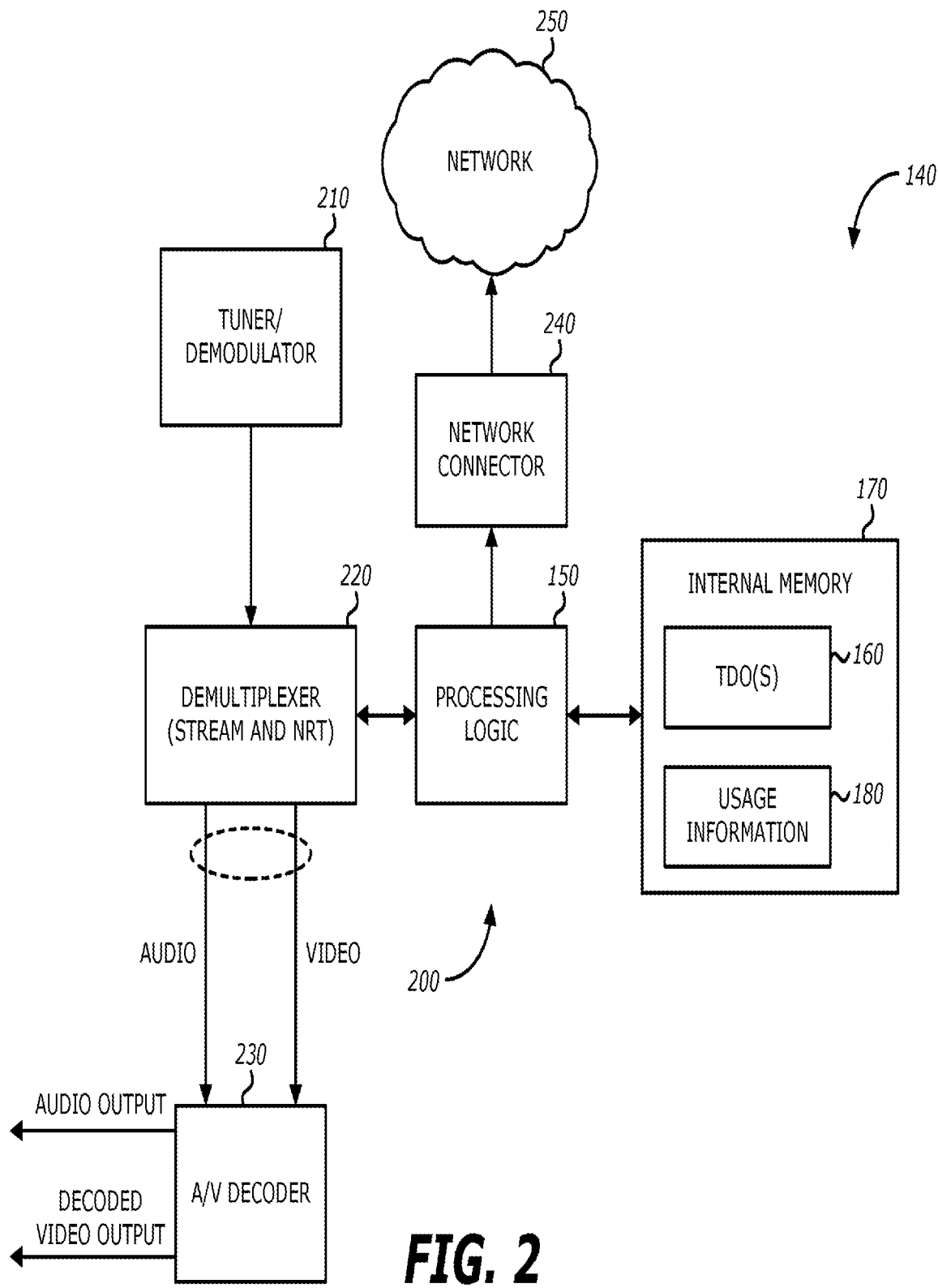
FIG. 2 is a block diagram of an exemplary embodiment of a receiver implemented within the electronic device of FIG. 1.

Referring now to FIG. 2, a block diagram of an exemplary embodiment of a receiver 200 implemented within electronic device 140 of FIG. 1 is shown. Receiver 200 comprises processing logic 150 and internal memory 170 as well as a tuner/demodulator 210, a demultiplexer 220, and an audio/video decoder 230.

According to one embodiment of the invention, tuner/demodulator 210 receives a modulated input signal, tunes and demodulates the signal to produce an output transport stream. Demultiplexer 220 demultiplexes the stream to provide data to processing logic 150. In the case of conventional real-time (linear) TV content, audio and video packets from tuner/demodulator 210 are supplied, via demultiplexer 220, to A/V decoder 230 for decoding. A/V decoder 230 supplies an audio output signal and a video output signal to audio and video circuitry of electronic device 140 (not shown).

Content including NRT files, metadata, and TDOs received at demultiplexer 220 is routed to internal memory 170. Internal memory 170 is further adapted to receive usage information 180 from other logic for storage therein. Internal memory 170 may include a disc drive, a non-volatile memory, or any other types of data storage device.

When a user instructs the electronic device to play a selected item of NRT content, that content is then processed by processing logic 150 and demultiplexed by demultiplexer 220 to provide audio and video packets to A/V decoder 230 to be eventually presented to the user.

Additionally, when the user selects the channel through which content (e.g., broadcast television programming content) is downloaded or instructs the electronic device to play a selected item of NRT content, a particular TDO is scheduled for execution. The particular TDO may be provider specific and selected based on any number of factors: (1) the channel number being tuned to or over which NRT content is downloaded, (2) the identity of the provider from metadata that accompanies the broadcast programming content or NRT content, or the like. A reporting script in TDO 160 is executed to obtain information for accessing usage information 180 that pertained to the events involving advanced services and were recorded by event recording logic 190. For instance, the information may be a pointer to one or more files associated with the recorded events (hereinafter referred to as "event log files").

Thereafter, after such accessing, the usage information is uploaded to a network interface 240 of electronic device 140. From interface 240, the usage information is transmitted over a network 250 to a server or other device selected for receipt of such transmissions for subsequent analysis of this information. The usage information may be used to discern user interactivity in the use of advanced services offered by the ATSC standard for example.

Figure 3:
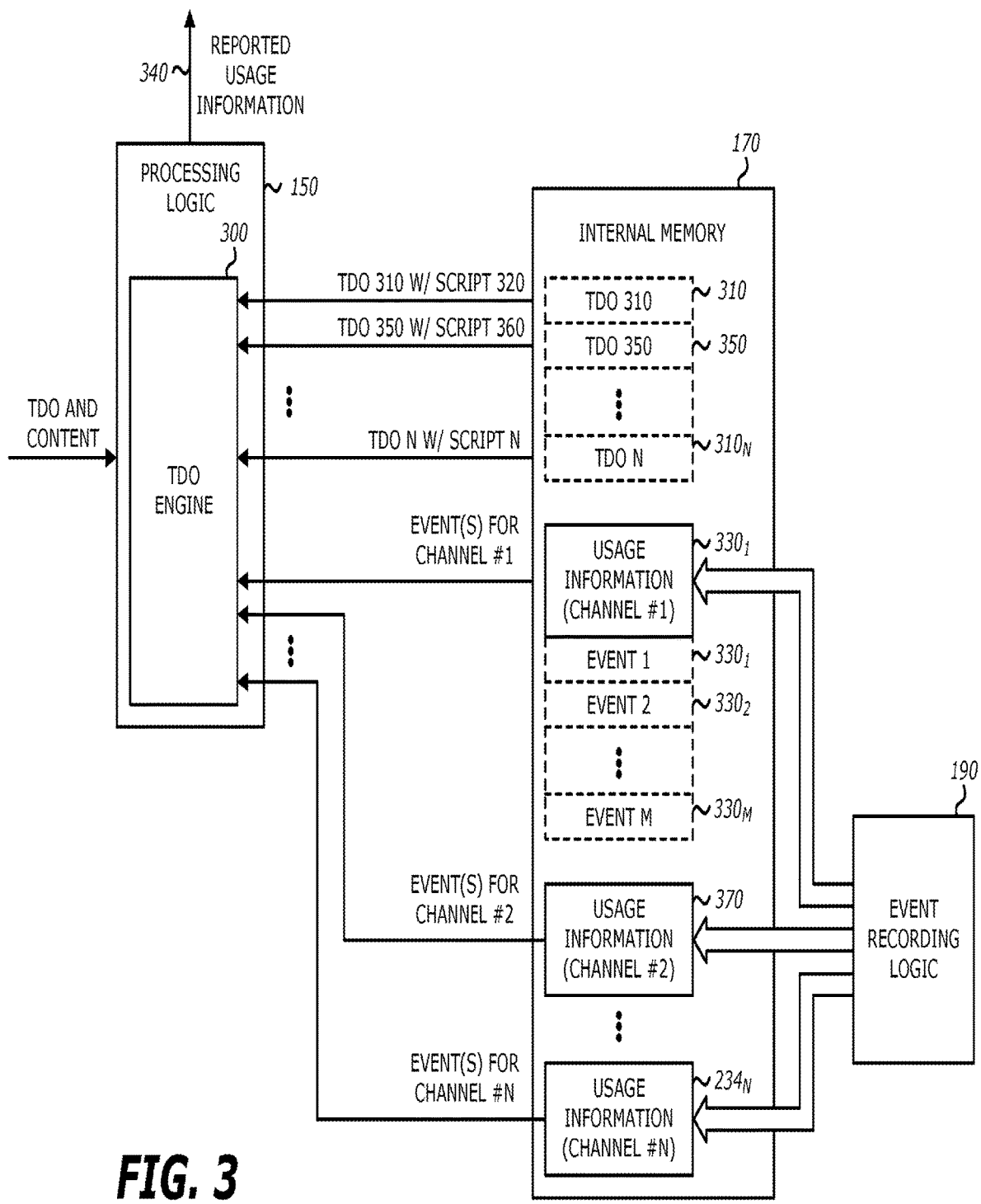
FIG. 3 is a block diagram of an exemplary embodiment of a processing logic operating in concert with event reporting logic for reporting of usage information for advanced services.

Referring now to FIG. 3, a block diagram of an exemplary embodiment of processing logic 150 operating in concert with event recording logic 190 for the reporting of usage of advanced services is shown. Herein, processing logic 150 comprises a TDO engine 300. TDO engine 300 is logic that generally operates as a TDO player by retrieving and subsequently executing a TDO associated with the channel (and/or service provider) associated with content currently being played back or scheduled for playback.

According to this embodiment of the invention, upon electronic device 140 tuning to channel 1, TDO 310 associated with channel 1 (or with the service provider transmitting content over channel 1) is downloaded to TDO engine 300. Such downloading may be in response to a message initiated by processing logic 150 upon detection that electronic device 140 has tuned to channel 1. TDO 310 features a reporting script 320 that, when executed, obtains information associated with the usage of advanced services as content is transmitted via channel 1. Retrieved from one or more event log files (identified below), such usage information describes one or more events that were detected by either TDO 310 or event recording logic 190 and stored accordingly in internal memory 170.

More specifically, during execution, reporting script 320 detects a storage location of usage information 330 associated with channel 1 (service provider). This storage location may be identified by either (i) a unique filename associated with selected channel (or service provider) or (ii) a specific address reserved for usage information associated with the channel (or service provider). Thereafter, reporting script 320 is adapted to recover usage information 330 from "M" event log files $330_1$-$330_M$ and transmit the same over a network connection 340 to an electronic device designated by TDO 310.

Thereafter, upon electronic device 140 tuning to channel 2, TDO 350 associated with channel 2 (or service provider transmitting content on channel 2) is downloaded to TDO engine 300. As previously stated, the downloading of TDO 350 may be in response to any trigger to identify that electronic device 140 has turned to channel 2. TDO 350 features a reporting script 360 that, when executed, obtains information associated with the usage of advanced services while tuned to channel 2. Such usage information 370 is extracted from event log files associated with events detected by TDO 350 and stored accordingly, or may be events detected by event recording logic 190 and stored with those events detected by TDO.

Similar to the script execution denoted above, reporting script 360 detects a storage location (e.g., file, address, etc.) of usage information 370 associated with channel 2 (or service provider). Thereafter, reporting script 360 is adapted to recover usage information 370 and route the same over network connection 340 to an electronic device designated by TDO 350.

Figure 4:
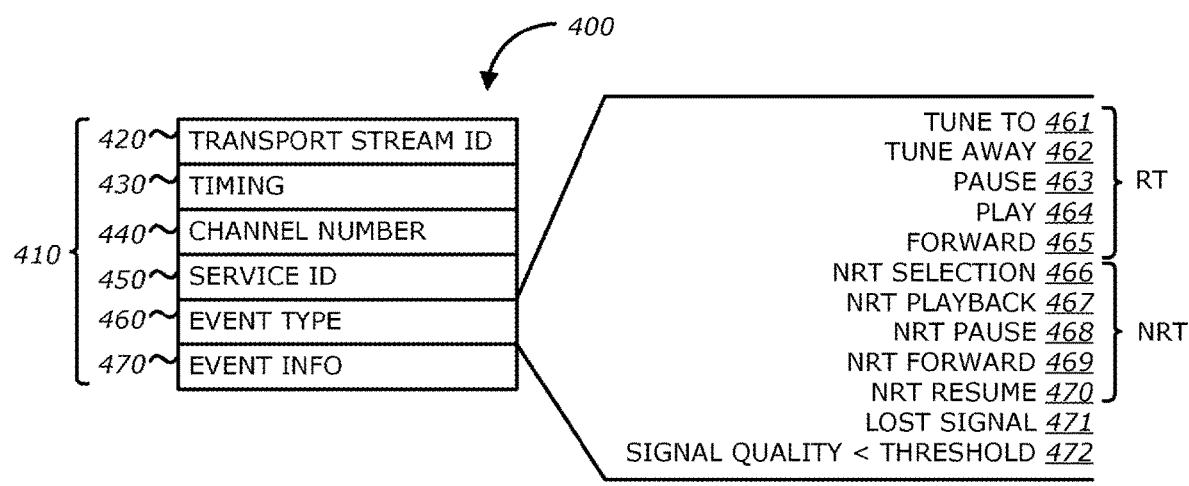
FIG. 4 is a block diagram of an exemplary embodiment of an event log file identifying a plurality of event type parameters identifying the type of event associated with the event log file.

Referring to FIG. 4, a block diagram of an exemplary embodiment of an event log file 400 (e.g., log file $330_1$) that comprises a plurality of attributes 410 is shown. Herein, according to this embodiment of the invention, event log file 400 comprises a transport stream ID attribute 420, a timing attribute 430, a channel number attribute 440, a service identifier attribute 450, one or more event type attributes 460 along with optional event information that may provide additional information concerning the particular event type.

The transport stream ID attribute 420 is used to identify the content being playback during the detected event.

The timing attribute 430 is used to provide timing as to when the event occurred. For instance, timing attribute may provide a date, and time of day (hour, minute, second). According to another embodiment of the invention, timing attribute 430 may provide a relative time from a start time of playback of the content. For instance, for an event that occurs at 14:15:06 during a broadcast of a thirty (30) minute program starting at 14:00:00, timing attribute 430 may be a value representing 00:15:06.

The channel number attribute 440 identifies a channel that the receiver was tuned to at the time of the event.

The service ID 450 identifies a service that the detected event is associated with. As an example, the services may include, but are not limited or restricted to the linear television broadcast service and a non-real-time (NRT) service. In the case of NRT, multiple services may be offered within the same virtual channel. The Service ID thus associates the indicated event type and information with a particular service within the identified virtual channel.

As shown in detail in FIG. 4, event type attribute 460 identifies the event represented by event log file 400. There are multiple types of events that may be detected and reported back to the service provider. For instance, the events may include, but are not limited or restricted to the following operations performed by electronic device:

1) Type-1 461: tuned to the channel in question;
2) Type-2 462: tuned away from the channel in question;
3) Type-3 463: Paused playback of the real-time content;
4) Type-4 464: Continued playback of the real-time content;
5) Type-5 465: Fast-forward the real-time content;
6) Type-6 466: Selection of the non-real-time (NRT) content;

7) Type-7 467: Playback of the NRT content;
8) Type-8 468: Paused playback of the NRT content;
9) Type-9 469: Fast-forward of the NRT content;
10) Type-10 470: Continued playback of the NRT content;
11) Type-10 471: Loss of downloaded content that may be used for comparison with other end users in the same vicinity to determine equipment performance issues—equipment that needs repair or adjustment to address signal strength (or lack of signal) issues; and
12) Type-11 472: Reduction of signal quality below preset threshold to also determine equipment performance issues specific to the end user.

According with event log file 400 illustrated in FIG. 4, timing and event type attributes 430 and 460 may collectively identify a time at which an end user tuned to a channel associated with event log file 400. Similarly, timing and event type attributes 430 and 460 may collectively identify a time at which an end user tuned away from the prescribed channel or conducted user display controls (pause, resume, playback, and forward) of content being downloaded when the event occurred.

Figure 5:
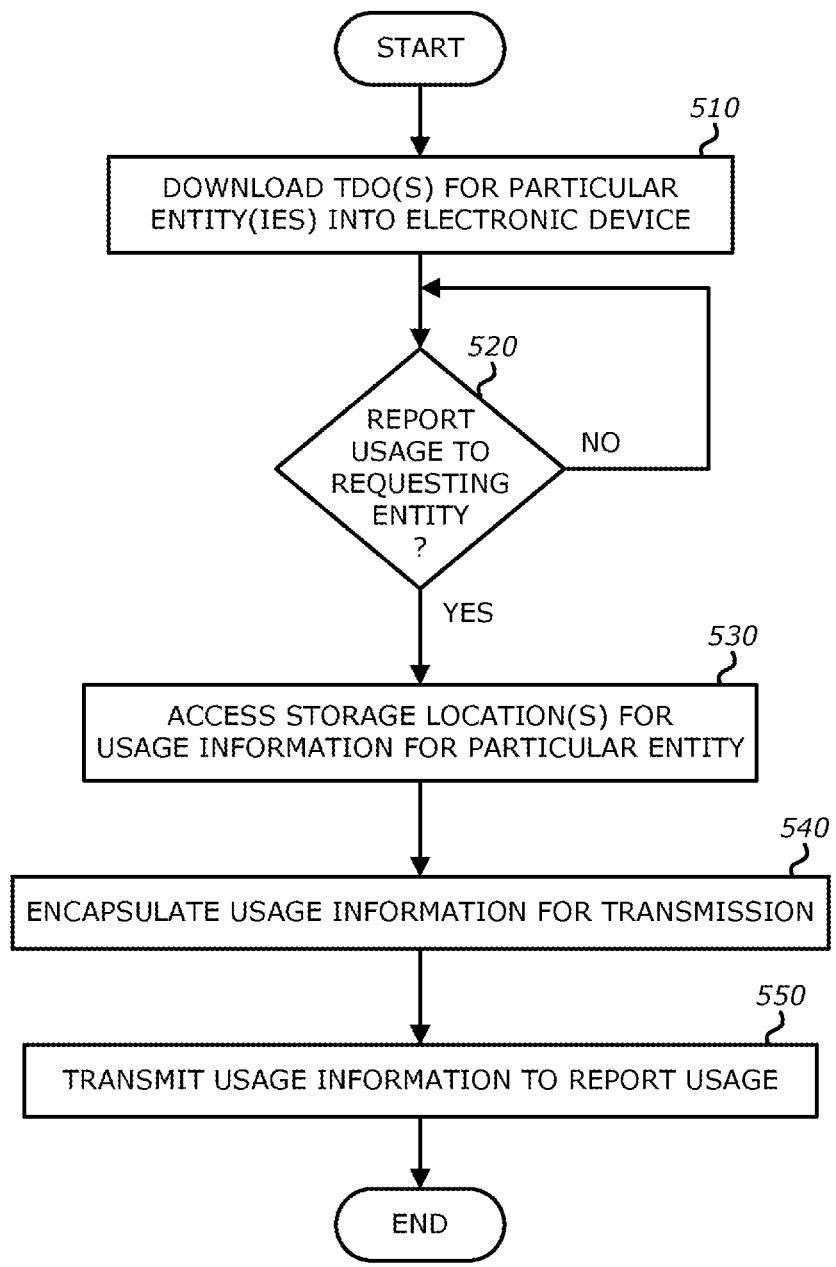
FIG. 5 is a block diagram of an exemplary embodiment of the operations of configuring the electronic device with a reporting scheme associated with the usage of advanced services.

Referring to FIG. 5, a block diagram of an exemplary embodiment of the operations of configuring the electronic device with a reporting scheme associated with the usage of advanced services is shown. Initially, a TDO for a particular service provider (categorized by channel, provider-specific, etc.) is downloaded for execution by processing logic (block 510). Next, a determination is made whether usage of advanced services needs to be reported to the service provider (block 520).

If usage of advanced services is to be reported, the TDO accesses the event log files assigned to the channel (or provider) as set forth in block 530. This may be accomplished through a variety of mechanisms, including use of APIs to obtain information where such event log files are stored. Thereafter, the recorded usage information is obtained from the event log file(s), encapsulated into a selected message format for transmission, and transmitted to the service provider (or an entity authorized by the service provider) as set forth in blocks 540 and 550.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents. The description is thus to be regarded as illustrative instead of limiting.

What is claimed is:

1. A receiver adapted to receive digital content, the receiver comprising:
   circuitry configured to:
   receive a digital television signal, the digital television signal including the digital content and location information of a server in a network to which usage information is to be reported, the usage information being associated with one or more detected events that occur during playback of the digital content,
   record the usage information, and
   provide, via a network connection, the usage information to the server at a location indicated by the location information included in the digital television signal;
   a tuner configured to receive a modulated input signal corresponding to the digital television signal, and to demodulate the input signal to produce an output transport stream that includes the digital content; and
   a demultiplexer configured to demultiplex the output transport stream for processing by the circuitry.

2. The receiver of claim 1, wherein the usage information associated with the one or more detected events is stored in an event log file, the event log file including a transport stream ID attribute, a timing attribute, a channel number attribute, and an event type attribute.

3. The receiver of claim 2, wherein the timing attribute includes a timing value as to when an event associated with the event type attribute occurred.

4. The receiver of claim 2, wherein the channel number attribute identifies a channel to which the receiver is tuned upon detecting an event.

5. The receiver of claim 2, wherein the event type attribute identifies an event represented by the event log file.

6. The receiver of claim 2, wherein the event type attribute identifies a tuning away from a channel identified by the channel number attribute.

7. The receiver of claim 2, wherein the event type attribute identifies one of a pause and fast-forward of the digital content, the digital content being content transmitted in real-time.

8. The receiver of claim 2, wherein the event type attribute identifies the digital content being non-real-time content selected by a user.

9. The receiver of claim 2, wherein the event type attribute identifies one of a pause and fast-forward of the digital content, the digital content being non-real-time content selected by a user.

10. The receiver of claim 2, wherein the event type attribute identifies a loss of the digital content.

11. The receiver of claim 2, wherein the event type attribute indicates a reduction of signal quality below a preset threshold.

12. The receiver of claim 1, wherein the circuitry is configured to download a triggered declarative object (TDO) from a terrestrial broadcast stream, the TDO including a reporting script that is programmed to cause the usage information to be transmitted to the server.

13. A method for reporting events from a receiver that supports playback of digital content, the method comprising:
   receiving, by circuitry of the receiver, a digital television signal, the digital television signal including the digital content and location information of a server in a network to which usage information is to be reported, the usage information being associated with one or more detected events that occur during playback of the digital content;
   recording, by the circuitry of the receiver, the usage information;
   providing, by the circuitry of the receiver via a network connection, the usage information to the server at a location indicated by the location information included in the digital television signal;
   receiving a modulated input signal corresponding to the digital television signal;
   demodulating the input signal to produce an output transport stream that includes the digital content; and
   demultiplexing the output transport stream for processing by the circuitry.

14. The method of claim 13, wherein the usage information associated with the one or more detected events is stored in an event log file, the event log file including a transport stream ID attribute, a timing attribute, a channel number attribute, and an event type attribute.

15. The method of claim 14, wherein the event type attribute identifies a tuning away from a channel identified by the channel number attribute.

16. The method of claim 14, wherein the event type attribute identifies the digital content being non-real-time content selected by a user.

17. The method of claim 14, wherein the event type attribute identifies a loss of the digital content.

18. The method of claim 14, wherein the event type attribute indicates a reduction of signal quality of the digital content below a preset threshold.

19. The method of claim 13, comprising:
    transmitting the usage information to the server via the network connection, upon execution of a reporting script included in a downloadable triggered declarative object (TDO).

20. The receiver of claim 12, wherein the reporting script detects a storage location of the usage information by a unique file name associated with a channel or a specific address reserved for the usage information associated with the channel.

* * * * *